(12) United States Patent
Yoo et al.

(10) Patent No.: US 10,658,963 B2
(45) Date of Patent: May 19, 2020

(54) FLUX OBSERVER-BASED CONTROL STRATEGY FOR AN INDUCTION MOTOR

(71) Applicant: GM Global Technology Operations LLC, Detroit, MI (US)

(72) Inventors: Anno Yoo, Rochester Hills, MI (US); Nathan Minor, Pontiac, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 50 days.

(21) Appl. No.: 16/156,292

(22) Filed: Oct. 10, 2018

(65) Prior Publication Data
US 2020/0119680 A1 Apr. 16, 2020

(51) Int. Cl.
H02P 23/14 (2006.01)
H02P 23/08 (2006.01)
H02P 6/28 (2016.01)

(52) U.S. Cl.
CPC .............. *H02P 23/14* (2013.01); *H02P 6/28* (2016.02); *H02P 23/08* (2013.01)

(58) Field of Classification Search
CPC . H02P 6/28; H02P 23/14; H02P 21/14; G01R 31/343; B60L 3/12; B60L 3/0061
See application file for complete search history.

(56) References Cited

U.S. PATENT DOCUMENTS

| | | | | |
|---|---|---|---|---|
| 4,777,422 A * | 10/1988 | Slicker | ............... | H02P 21/141 318/800 |
| 5,334,923 A * | 8/1994 | Lorenz | ............... | H02P 6/187 318/805 |
| 5,796,236 A * | 8/1998 | Royak | ............... | H02P 21/09 318/801 |
| 9,106,177 B2 * | 8/2015 | Son | ............... | H02P 21/14 |
| 2003/0151385 A1 * | 8/2003 | Wu | ............... | H02P 21/10 318/727 |
| 2009/0140676 A1 * | 6/2009 | Son | ............... | H02P 21/13 318/400.04 |
| 2015/0091483 A1 * | 4/2015 | Osamura | ............... | H02P 21/141 318/400.25 |
| 2017/0085202 A1 * | 3/2017 | Yoo | ............... | H02P 21/14 |

OTHER PUBLICATIONS

Gang-Youl Jeong, "Speed-sensorless induction motor control system using a rotor speed compensation with the rotor flux error," 2004 IEEE 35th Annual Power Electronics Specialists Conference (IEEE Cat. No. 04CH37551), Aachen, Germany, 2004, pp. 1398-1403 vol. 2. (Year: 2004).*

* cited by examiner

*Primary Examiner* — Eduardo Colon Santana
*Assistant Examiner* — Said Bouziane
(74) *Attorney, Agent, or Firm* — Quinn IP Law

(57) ABSTRACT

A method for regulating operation of an induction motor having a rotor includes calculating a rotor flux angle error value, via a flux observer of a controller, using estimated d-axis and q-axis flux values of the rotor, estimating rotor position using a position observer of the controller, and calculating slip position of the rotor using d-axis and q-axis stator currents. The method also includes estimating a rotor flux angle as a function of slip position and estimated rotor position, calculating a corrected rotor flux angle by selectively adding the rotor flux angle error value to the estimated rotor flux angle, and controlling output torque of the motor using the corrected rotor flux angle. A logic switch may be used to selectively add the rotor flux angle.

18 Claims, 2 Drawing Sheets

FLUX OBSERVER-BASED CONTROL STRATEGY FOR AN INDUCTION MOTOR

INTRODUCTION

An induction motor includes a stator and a bearing-mounted rotor that are separated from each other by a small air gap. The non-linear nature of an induction motor's torque response can sometimes lead to increased torque error at higher speeds, with the term "torque error" describing the difference between commanded and actual torque levels. The present approach is intended to address this potential control problem and thereby improve induction motor torque performance.

Generation and real-time control of a rotating magnetic field (RMF) is required for proper operation of an induction motor. The RMF cuts across conductive windings of the rotor to induce a periodic voltage in the rotor's phase windings. Resultant currents in the phase windings interact with the RMF within the small stator-rotor air gaps to produce torque in the rotational direction of the RMF. Because torque generation occurs when the rotor rotates at less than the RMF's speed, i.e., its synchronous speed, induction motors are commonly referred to in the art as "asynchronous motors".

Slip of a rotor in an induction motor is defined as the difference between the synchronous speed ($n_s$) and the rotor speed ($n_r$), with slip (s) usually expressed as a percentage, i.e.:

$$s = \frac{n_s - n_r}{n_s} \times 100.$$

The synchronous speed may be expressed as:

$$n_s = \frac{120f}{P}$$

with P representing the number of poles of the induction motor and f being the frequency of the motor's polyphase supply voltage. Slip in an induction motor may be difficult to accurately calculate under certain operating conditions, which in turn may lead to the above-noted torque accuracy problem and other performance issues.

SUMMARY

A control strategy is disclosed herein for regulating operation of an induction motor. The torque response of an induction motor may degrade with temperature, as well as with saturation or variation in motor control parameters. For these and other reasons, the torque response of an induction motor tends to be non-linear, with higher torque error possibly resulting at high motor speeds or under other conditions. The present control strategy is intended to improve upon the current state of the art of induction motor control by increasing torque linearity and accuracy, as well as by providing other performance advantages as described in detail below.

In particular, the disclosed methodology uses a flux observer in the synchronous reference frame of the motor to estimate a rotor flux angle error level for the induction motor, with the term "rotor flux angle" referring to the angle at which magnetic field lines intersect a cross-sectional area of the rotor's conductors. Flux angle error, which is determined by a controller using estimated direct-axis (d-axis) and quadrature-axis (q-axis) rotor flux values, is then added to a calculated rotor flux angle to derive a corrected flux angle value. The corrected flux angle value is thereafter used in ongoing torque control operations of the induction motor.

D-q axis transformation is a mathematical transformation technique that is commonly used to simplify the analysis of polyphase electrical circuits, e.g., three-phase alternating current (AC) circuits such as those considered by the present disclosure. As will be appreciated by those of ordinary skill in the art of motor controls, the d-axis is the motor axis on which magnetic flux is generated, while the q-axis is the axis on which torque is ultimately generated. By convention, the q-axis leads the d-axis by 90°. Thus, d-axis and q-axis current commands issued by the controller to the stator, and resultant d-axis and q-axis currents formed in the rotor, are regulated to produce a desired effect on the motor's torque operation.

Additionally, a dynamical model of a motor typically includes three reference frames: a stationary reference frame in which the d-axis and q-axis do not rotate, a rotor reference frame in which the d-axis and q-axis rotate at rotor speed, and a synchronous reference frame in which the d-axis and q-axis rotate at the synchronous speed of the induction motor. The above-noted flux observer, by operating in the synchronous reference frame, is thus rendered sufficiently robust to ongoing changes in rotor speed.

Control of the induction motor also requires accurate real-time calculation of the rotor flux angle, with the flux observer of the present disclosure also helping to improve the accuracy of such calculations. That is, the flux observer estimates the d-axis and q-axis rotor flux and thereafter uses the estimated flux values to calculate a rotor flux angle error value, e.g., as the arctangent of the d-axis and q-axis flux. Meanwhile, a rotor position observer operating in the stationary reference frame of the motor may be used to estimate rotor position, i.e., the angular position of the rotor, using inputs from a rotary position sensor. A corrected rotor flux angle is determined by applying the rotor flux angle error to the estimated rotor flux angle. The corrected rotor flux angle is thereafter used to control operation of the induction motor.

In an example embodiment, a method for regulating operation of the induction motor includes calculating a rotor flux angle error value, via the flux observer of the above-noted controller, using estimated rotor d-axis and q-axis flux values. The method also includes estimating angular position of the rotor using a position observer of the controller, i.e., a state observer working in the motor's stationary reference frame. The method further includes calculating the rotor's slip position via the position observer using d-axis and q-axis stator current commands from the controller.

As part of the example method, the controller estimates the rotor flux angle of the rotor as a function of slip position and estimated rotor position to generate an estimated rotor flux angle, and also calculates the corrected rotor flux angle by adding the rotor flux angle error value to the estimated rotor flux angle. The controller then controls output torque of the induction motor using the corrected rotor flux angle.

The flux observer may calculate the rotor flux angle value as the arctangent of the d-axis and q-axis flux values.

Calculating the rotor flux angle error value may be performed by the controller as a function of the d-axis and q-axis currents and voltages of the stator.

Optionally, a logic switch may be used having an ON state when a magnitude of the estimated d-axis flux value or the estimated q-axis flux value exceeds a calibrated threshold.

The rotor flux angle error value may be added to the estimated rotor flux angle when the logic switch is in the ON state. Alternatively, the controller may be configured to apply a variable gain value at a magnitude of between 0 and 1 to the rotor flux angle error value, with the magnitude of the gain value corresponding to a magnitude of the estimated d-axis or q-axis flux value.

Calculating a slip position of the rotor may include calculating the rotor's slip frequency as a function of a predetermined electrical resistance and a predetermined inductance of the rotor, and a predetermined mutual inductance of the rotor and stator.

Controlling the output torque of the induction motor may include generating and delivering torque from the induction motor to a coupled load via the rotor. In some embodiments, the coupled load may be one or more drive wheels of a motor vehicle.

An electrical system is also disclosed herein having the induction motor, a rotary position sensor, and a controller configured to execute the method noted above.

The above features and advantages and other features and advantages of the present disclosure are readily apparent from the following detailed description of the best modes for carrying out the disclosure when taken in connection with the accompanying drawings.

Figure 1:
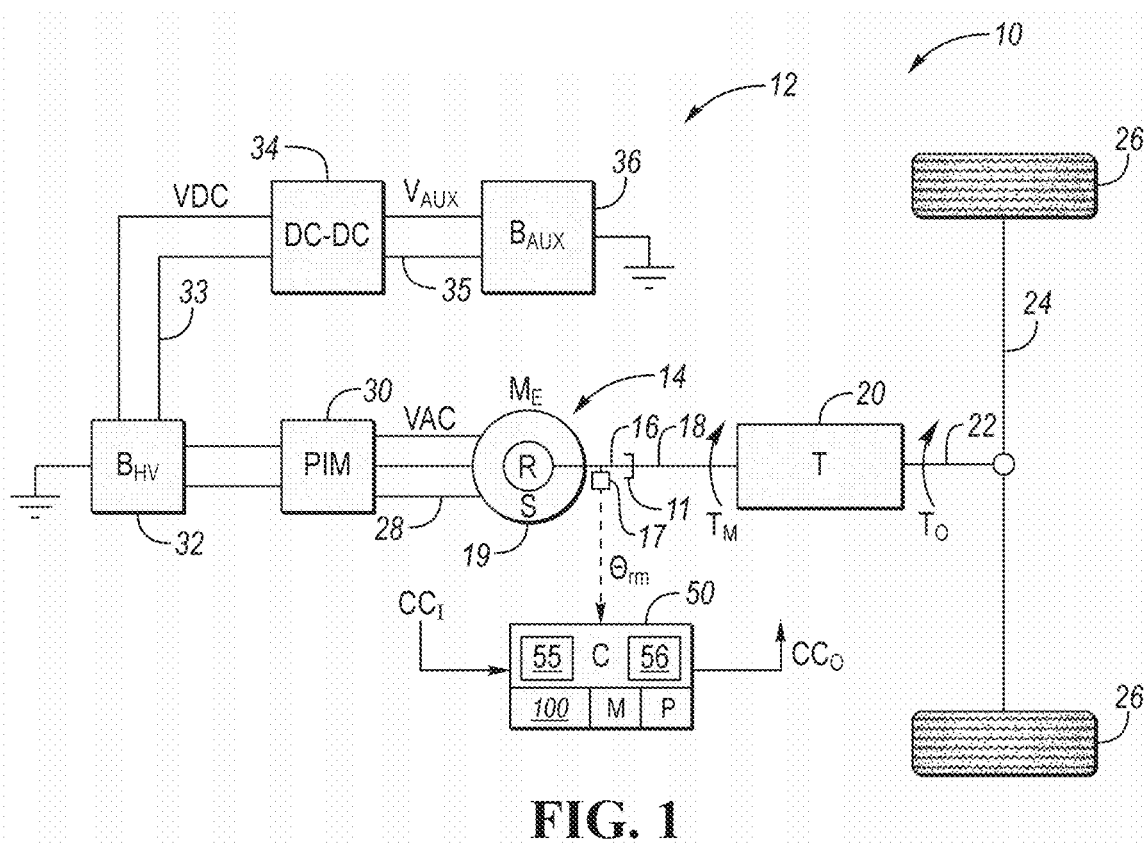
FIG. 1 is a schematic illustration of an example electrical system having a polyphase induction machine coupled to a load and controlled via a controller using a flux observer as set forth herein.

The present disclosure is amenable to various modifications and alternative forms, and some representative embodiments are shown by way of example in the drawings and will be described in detail herein. Novel aspects of this disclosure are not limited to the particular forms illustrated in the above-enumerated drawings. Rather, the disclosure is to cover modifications, equivalents, and combinations falling within the scope of the disclosure as encompassed by the appended claims.

DETAILED DESCRIPTION

This disclosure is susceptible of embodiment in many different forms. Representative embodiments of the disclosure are shown in the drawings and will herein be described in detail with the understanding that these examples are provided as a representation of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example.

Referring to the drawings, wherein like reference numbers correspond to like or similar components throughout the several figures, an example vehicle 10 is shown in FIG. 1. The vehicle 10 include an electrical system 12 having an electric machine in the form of an induction motor ($M_E$) 14, the operation of which is automatically regulated in real-time by an electronic controller (C) 50. As described below with particular reference to FIGS. 2-4, the controller 50 receives a set of input signals (arrow $CC_I$) and, responsive to the input signals (arrow $CC_I$), generates a set of output control signals (arrow $CC_O$), including a corrected rotor flux angle as detailed below with reference to FIGS. 2-4. The control signals (arrow $CC_O$) ultimately increase, decrease, or maintain a level of motor torque (arrow $T_M$) produced by the induction motor 14.

Figure 2:
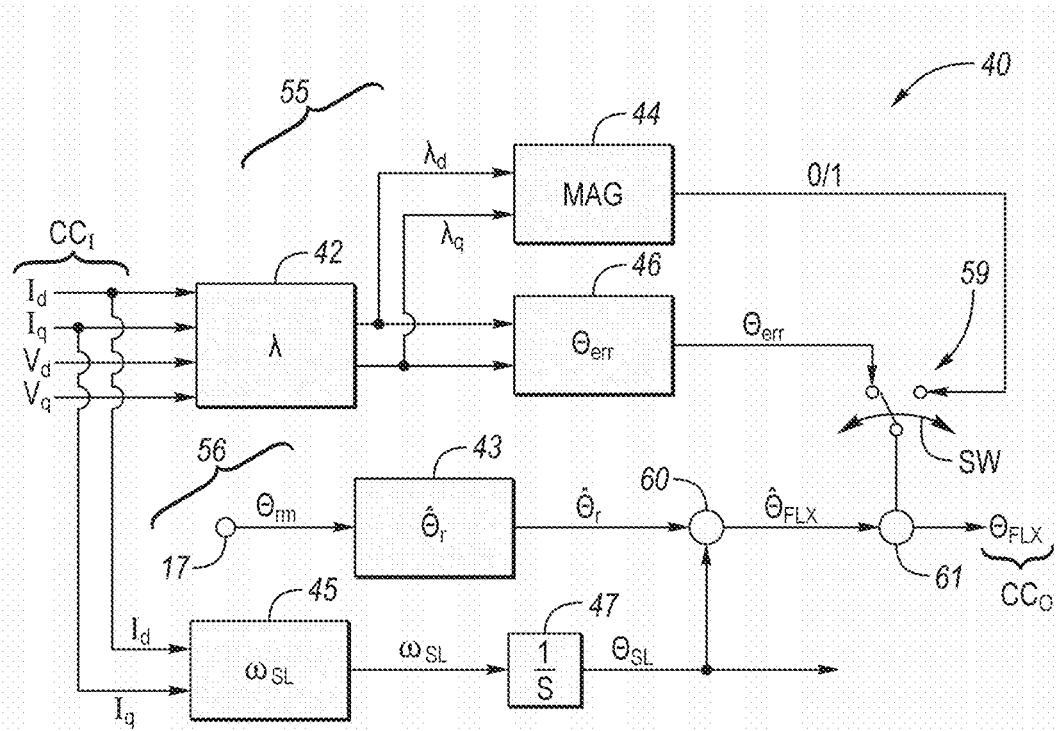
FIG. 2 is a schematic logic flow diagram of the controller shown in FIG. 1.
Figure 3:
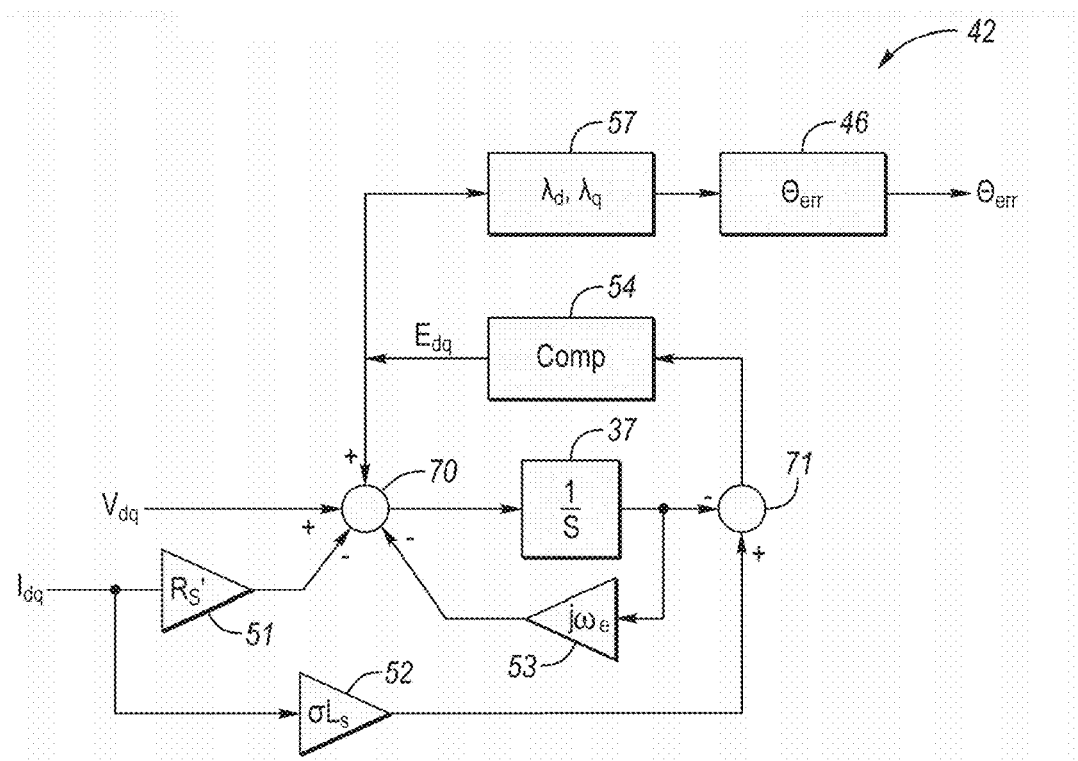
FIG. 3 is a schematic logic flow diagram of a flux observer in the synchronous time frame that is usable as part of the controller of FIG. 2.

To perform its overall control efforts, the controller 50 is programmed with a flux observer 55, i.e., a state observer of magnetic flux that operates in the synchronous frame of reference of the induction motor 14. The controller 50 additionally includes a position observer 56, i.e., a state observer of angular position of a rotor (R) 16 of the induction machine 14 that operates in the stationary frame of reference of the induction motor 14. The flux observer 55 and the position observer 56 may be embodied as programmed control logic of the controller 50, for instance as depicted in FIGS. 2 and 3, with the example control logic used in the execution of an example method 100 as set forth below with reference to FIG. 4.

The controller 50 of FIG. 1 may include one or more digital computers each having a processor (P), e.g., a microprocessor or central processing unit, as well as memory (M) in the form of read only memory, random access memory, electrically-programmable read only memory, etc., a high-speed clock, analog-to-digital and digital-to-analog circuitry, input/output circuitry and devices, and appropriate signal conditioning and buffering circuitry. Although omitted for illustrative simplicity, the controller 50 may be electrically connected to a power supply within the electric system 12, such as an auxiliary battery (BAux) 36 powered via a direct current (DC) auxiliary voltage bus 35.

The electric system 12 shown schematically in FIG. 1 is described herein as being part of the vehicle 10 solely for the purpose of illustration, and thus without limiting the electric system 12 to vehicular use in general or automotive applications in particular. Induction machines such as the induction motor 14 are widely used in different manufacturing environments, power plants, and in consumer products, as well as in non-automotive applications such as rail vehicles, aircraft, and marine vessels, and therefore such applications may benefit from extension of the present teachings.

The induction motor 14 may be embodied as a polyphase/AC induction machine having the rotor 16 and a stator (S) 19. The angular position of the rotor 16, and thus its rotational speed, may be measured at discrete points using a rotary position sensor 17, with the position sensor 17 outputting a measured position signal (arrow $\theta_{rm}$) indicative of the measured angular position of the rotor 16. The position signal (arrow $\theta_{rm}$) may be communicated to the controller 50 over a low-voltage transfer conductor or a wireless path.

In the illustrated vehicular application, the rotor 16 may be selectively coupled to an input member 18 of a transmission (T) 20 via an input clutch 11, such as a friction clutch or a hydrodynamic torque converter. The transmission 20 may include one or more internal clutches and gear sets (not shown) that ultimately transfer motor torque ($T_M$) from the input member 18 to a transmission output member 22 to thereby produce transmission output torque ($T_O$). Although not shown in FIG. 1, the vehicle 10 may optionally include an internal combustion engine and/or additional electric machines which, depending on the operating mode, may combine with the motor torque ($T_M$) to provide the transmission output torque ($T_O$) at a desired level. The transmission output torque (arrow $T_O$) is then transmitted to one or more drive axles 24, which in turn are coupled to a load, in this instance a set of drive wheels 26.

As part of the electric system 12 depicted in FIG. 1, individual phase windings of the induction machine 14 may be energized via a polyphase voltage (VAC) that is present on an AC voltage bus 28. The polyphase voltage (VAC) may be produced as part of a power inverter module (PIM) 30 using internal semiconductor switching and signal filtering, e.g., pulse width modulation, as will be appreciated by those of ordinary skill in the art. DC supply voltage (VDC) to the PIM 30, also referred to as a DC link voltage, may be provided by a high-voltage battery pack ($B_{HV}$) 32 over a DC voltage bus 33, with the DC voltage bus 33 possibly connected to a DC-DC voltage converter 34. The voltage output of the DC-DC voltage converter 34 may be at the reduced/auxiliary voltage ($V_{AUX}$), e.g., 12-15V or another level suitable for storage in the auxiliary battery ($B_{AUX}$) 36.

Figure 4:
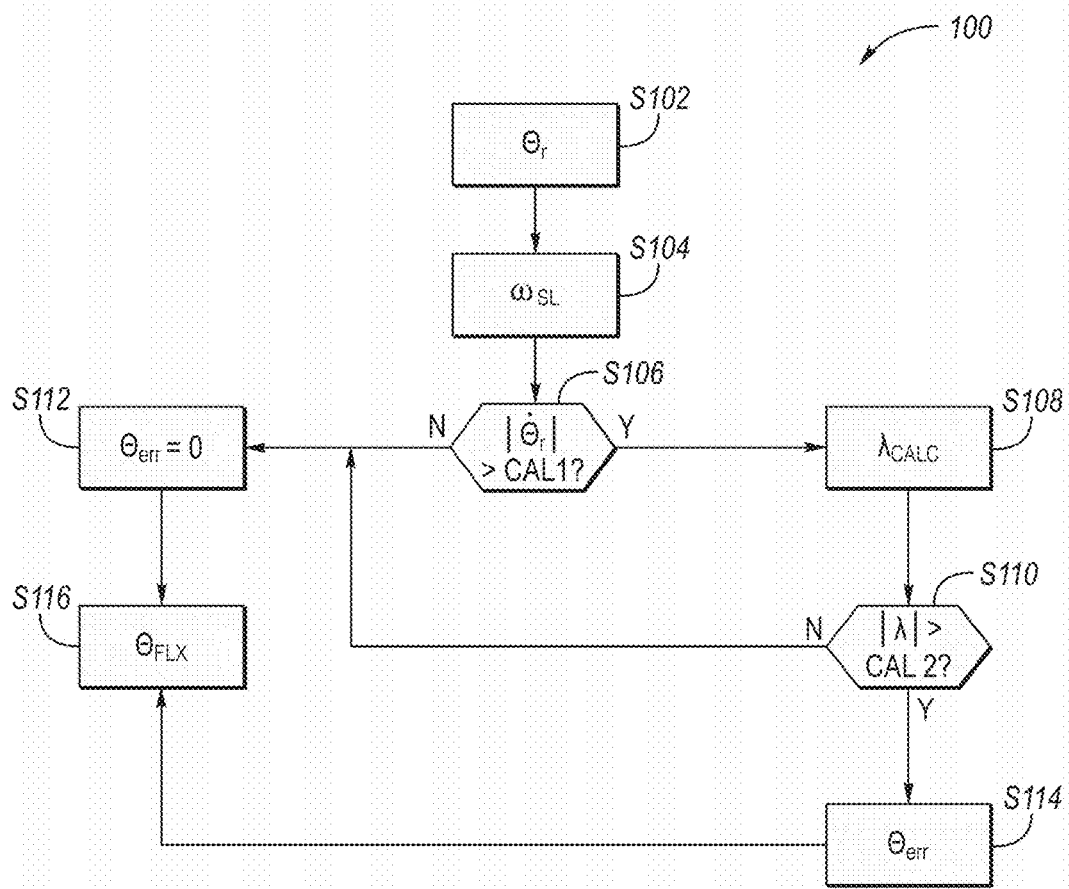
FIG. 4 is a flow chart describing an example method for implementing a control strategy using the flux observer shown in FIG. 3.

Referring to FIG. 2, control logic 40 is depicted schematically for implementing the method 100 described herein, with an example embodiment of the method 100 shown in FIG. 4. The flux observer 55 includes a flux calculation block ("λ") 42, a flux magnitude calculation block ("MAG") 44, and a flux error calculation block ("$\theta_{err}$") 46 in the illustrated embodiment.

Outside of the flux observer 55, the position observer 56 includes a rotor position estimation block ($\hat{\theta}_r$) 43, a slip calculation block ("$\omega_{SL}$") 45, and an integrator block (1/s) 47. In a possible embodiment, the flux observer 55 is used situationally, such that operation of the flux observer 55 is triggered using an optional logic switch 59 having a logic state of 0/OFF or 1/ON, with the logic state being based on the output of the flux magnitude calculation block 44. The logical switching operation is indicated by double-headed arrow SW. In an alternative embodiment, the flux observer 55 may be used continuously, such that its output is weighted by a variable gain factor as explained below. The position observer 56 is active regardless of the ON/OFF state of the optional logic switch 59.

Within the rotor position observer 56, control inputs to the slip calculation block 45 include the commanded d-axis and q-axis currents for the stator 19 of the induction motor 14 shown in FIG. 1, with such currents represented as arrows $i_d$ and $i_q$, respectively, and with the d-axis and q-axis current values being in the synchronous reference frame. Block 45 then calculates the slip frequency ($\omega_{SL}$), for instance as:

$$\omega_{SL} = \frac{R_r}{L_r} \frac{L_m}{\lambda_{dr}^e} i_{qs}^e \cong \frac{R_r}{L_r} \frac{i_{qs}^e}{i_{ds}^e}$$

where $R_r$ is a predetermined electrical resistance of the rotor 16, $L_m$ is a predetermined mutual inductance of the induction motor 14, Lr is a predetermined inductance of the rotor 16, $\lambda f_{dr}^e$ is the d-axis flux of rotor 16 in the synchronous reference frame (e), and $i_{qs}^e$ and $i_{ds}^e$ are the q-axis and d-axis currents (abbreviated as $i_q$ and $i_d$ in FIG. 2 for simplicity). Similarly, $v_{qs}^e$ and $v_{ds}^e$ are the respective q-axis and d-axis voltages (abbreviated as $V_q$ and $V_d$ in FIG. 2 for simplicity) used as set forth below.

The integrator block 47 of FIG. 2 operates on the calculated slip frequency ($\omega_{SL}$) from block 45 to generate an angular slip position ($\theta_{SL}$), which is then fed into a summation node 60. At summation node 60, the slip position ($\theta_{SL}$) is added to an estimated rotor position ($\hat{\theta}_r$), which is a value estimated by the rotor position estimation block 43 using the measured rotor position (arrow $\theta_{rm}$) as determined by the rotary position sensor 17 (also see FIG. 1). The output of the summation node 60 is the estimated rotor flux angle ($\hat{\theta}_{flx}$), which is also referred to in the art as the indirect field-oriented control angle due to its use in indirect field-oriented control of the induction motor 14. The estimated rotor flux angle ($\hat{\theta}_{flx}$) is then fed into another summation node 61 and added to the output of the flux observer 55 to calculate a corrected rotor flux angle ($\theta_{flx}$) as a control output (see arrow $CC_O$ of FIG. 1), which is thereafter used as the actual rotor flux angle in conducting torque control operations of the induction motor 14.

With respect to the flux observer 55 of FIG. 2 and its constituent logic blocks 42, 44, and 46, the flux calculation block 42 is used to calculate the d-axis and q-axis rotor flux values $\lambda_{dr}^e$ and $\lambda_{qr}^e$, abbreviated as $\lambda_d$ and $\lambda_q$ in FIG. 2 for simplicity, once again with the superscript "e" representing the synchronous reference frame. The d-axis flux value may be determined in real-time by the controller 50 as follows:

$$\lambda_{dr}^e = \frac{\frac{L_r}{L_m}}{\left(\frac{R_r}{L_r}\right)^2 + \omega_r^2} \left(\frac{R_r}{L_r} E_d + \omega_r E_q\right)$$

where $E_d$ and $E_q$ are the respective d-axis and q-axis components of estimated back-EMF of the induction motor 14 individually defined as:

$$E_d = R_r \frac{L_m}{L_r^2} \lambda_{dr}^e + \omega_r \frac{L_m}{L_r} \lambda_{qr}^e$$

$$E_q = -R_r \frac{L_m}{L_r^2} \lambda_{qr}^e + \omega_r \frac{L_m}{L_r} \lambda_{dr}^e$$

Similarly, the q-axis flux value may be determined as follows:

$$\lambda_{qr}^e = \frac{\frac{L_r}{L_m}}{\left(\frac{R_r}{L_r}\right)^2 + \omega_r^2} \left(-\frac{R_r}{L_r} E_q + \omega_r E_d\right)$$

Also as part of the flux observer 55, the flux magnitude calculation block 44 receives the d-axis and q-axis flux values from logic block 42 and determines the respective magnitudes of each. At the same time, the flux error calculation block 46 uses the d-axis and q-axis flux values to calculate the rotor flux position error ($\theta_{err}$), e.g.:

$$\theta_{err} = a\tan 2(\lambda_{dr}^e, \lambda_{qr}^e).$$

The optional logic switch 59 shown in FIG. 2 may be configured to feed the rotor flux position error ($\theta_{err}$) forward to the summation node 61 when the magnitude of the d-axis and q-axis rotor flux values ($\lambda_{dr}^e$ or $\lambda_{qr}^e$) exceeds a calibrated threshold. In this manner, the flux observer 55 may be implemented at specified torque operating regions of the induction motor 14.

Alternatively, the rotor flux position error ($\theta_{err}$) may be continuously scaled by the controller 50 using a variable gain factor ranging anywhere between and inclusive of 0 and 1, with such a gain factor being indicative of or in proportion to the magnitude from block 44. That is, the controller 50 may be configured to apply the variable gain value to the rotor flux position error ($\theta_{err}$) at a magnitude corresponding to a magnitude of the estimated d-axis flux value or the estimated q-axis flux value, e.g., the greater value thereof.

Referring briefly to FIG. 3, implementation of the flux observer 55 of FIG. 2 is shown in further detail. Inputs may include a complex voltage vector ($v_{dqs}^e$) and a complex current vector ($i_{dqs}^e$), respectively depicted as ($V_{dq}$) and ($I_{dq}$) in FIG. 3 for simplicity, the latter of which is processed via a gain block 51, labeled Rs' and a gain block 52 labeled σLs, i.e., the predetermined transient inductance of the induction motor 14. The relevant variables are defined as follows:

$$v_{ds}^e = R_s' i_{ds}^e + \sigma L_s \frac{d i_{ds}^e}{dt} - \omega_e \sigma L_s i_{qs}^e - R_r \frac{L_m}{L_r^2} \lambda_{dr}^e - \omega_r \frac{L_m}{L_r} \lambda_{qr}^e$$

$$v_{qs}^e = R_s' i_{qs}^e + \sigma L_s \frac{d i_{qs}^e}{dt} - \omega_e \sigma L_s i_{ds}^e - R_r \frac{L_m}{L_r^2} \lambda_{qr}^e - \omega_r \frac{L_m}{L_r} \lambda_{dr}^e$$

$$R_s' = R_s + R_r \frac{L_m^2}{L_r^2}$$

The output of gain block 51 is subtracted at node 70 from the sum of the voltage vector ($v_{dqs}^e$) and the estimated back-EMF ($E_{dq}$) from a compensator block ("COMP") 54, which is defined as $E_d + jE_q$ in complex vector form with the variable j being an imaginary term as will be appreciated. Subtracted at node 70 is the output of a gain block 53 ($j\omega_e$), with the variable $\omega_e$ being the stator frequency, and with the gain block 53 applied to the output of an integrator block 37 as shown.

At node 71, the output of integrator block 37 is subtracted from the output of gain block 52, i.e., the product of the transient reluctance (σLs) and the complex current vector ($i_{dqs}^e$), i.e., $I_{dq}$. The output of node 71 is fed into the compensator block 54 to calculate the estimated back-EMF ($E_{dq}$) noted above. The estimated back-EMF ($E_{dq}$) is also fed into rotor flux calculator block 57 to determine the d-axis and q-axis rotor flux values ($\lambda_{dr}^e$ and $\lambda_{qr}^e$) shown in FIG. 2 ($\lambda_d$ and $\lambda_q$ in FIG. 3), and from there, to calculate the rotor flux position error ($\theta_{err}$) via the rotor flux position error calculation block 46.

Referring to FIG. 4, the method 100 disclosed herein enables the controller 50 of FIG. 1 to regulate operation of the induction motor 14 via targeted use of the flux observer 55 of FIGS. 2 and 3. An exemplary embodiment of the method 100 commences with step S102.

At step S102, the controller 50 measures the angular position of the rotor 16 from the rotary position sensor 17 and estimates, between discrete measured positions, the rotor position ($\hat{\theta}_r$). This occurs, once again, in the stationary frame of reference of the induction motor 14. Step S102 may include processing the measured rotor position (arrow $\theta_{rm}$) of FIG. 1 from the rotary position sensor 17 through the flux calculation logic block 43 of FIG. 2. The method 100 then proceeds to step S104.

Step S104 includes calculating the slip frequency ((DO via the controller 50, which is a calculation that may be performed according to the equation provided above. The method 100 then proceeds to step S106.

At step S106, the controller 50 of FIG. 1 may compare the absolute value of rotor speed from step S102 to a calibrated threshold, i.e., $|\dot{\theta}_r| \geq CAL1$. The method 100 proceeds to step S108 when the calibrated threshold (CAL1) is exceeded, and to step S112 in the alternative when the calibrated threshold (CAL1) is not exceeded.

Step S108 includes running the flux observer 55 of FIGS. 2 and 3, and in particular flux calculation block 45, to estimate the d-axis and q-axis flux values of the rotor 16, as abbreviated "λ CALC" in FIG. 4. The method 100 then proceeds to step S110.

At step S110, the controller 50 of FIG. 1 may compare the absolute value of the flux values from step S110 to a calibrated threshold, e.g., $|\lambda| \geq CAL2$, with λ representing the values $\lambda_{dr}^e$ or $\lambda_{qr}^e$ ($\lambda_d$ and $\lambda_q$) as noted above. In some embodiments, the individual magnitudes may be compared to individual thresholds. Alternatively, the controller 50 may use the total flux magnitude in making the threshold comparison, e.g.:

$$|\lambda| = \sqrt{\lambda_{dr}^{e2} + \lambda_{qr}^{e2}} .$$

The method 100 proceeds to step S114 when the absolute value exceeds the threshold, and to step S112 in the alternative.

Step S112 includes setting the rotor flux position error value to zero, i.e., $\theta_{err} = 0$. The method 100 then proceeds to step S116.

Step S114 includes calculating the rotor flux angle error ($\theta_{err}$) via the flux observer 55 as set forth above with reference to FIGS. 2 and 3, which as noted above is done using the estimated d-axis and q-axis flux values. Calculation of the rotor flux angle error value may be performed by the controller 50 as a function of the d-axis and q-axis currents and voltages of the stator 19 of FIG. 1. The method 100 then proceeds to step S116.

At step S116, the corrected rotor flux angle ($\theta_{flx}$) is calculated by the controller 50 of FIG. 1, i.e., by selectively applying the rotor flux angle error value ($\theta_{err}$) from step S114 to the estimated rotor flux angle ($\hat{\theta}_{flx}$) output by node 60 of FIG. 2. As noted above, this may occur selectively using the logic switch 59 of FIG. 2 or using a variable gain value indicative of the flux magnitude from block 44 of FIG. 2. The corrected rotor flux angle ($\theta_{flx}$) is then used in controlling the level of torque of the induction motor 14 of FIG. 1.

That is, knowledge of the corrected rotor flux angle ($\theta_{flx}$) enables the controller 50 to determine precisely when, and by how much, to increase or reduce the d-axis and/i-axis currents, with weakening of the d-axis current serving to weaken the rotor flux. In turn, for a particular DC link voltage, weakened flux enhances the ability to accurately control the efficiency and power factor of the induction motor 14 as well as achieve a desired torque response. As such, the method 100 and the associated controller 50 provide specific improvements to computer-related technologies directed to real-time torque control of the example induction motor 14 of FIG. 1.

Aspects of the present disclosure have been described in detail with reference to the illustrated embodiments. Those skilled in the art will recognize, however, that modifications may be made without departing from the scope of the present disclosure. The present disclosure is not limited to the precise construction and compositions disclosed herein. Thus, modifications apparent from the foregoing descriptions are within the scope of the disclosure as defined by the appended claims. Moreover, the present concepts expressly include combinations and sub-combinations of the preceding elements and features.

The invention claimed is:

1. A method for regulating operation of an induction motor having a rotor and a stator, the method comprising:
    calculating a rotor flux angle error value, via a flux observer of a controller, using an estimated d-axis flux value and an estimated q-axis flux value of the rotor, wherein the flux observer operates in a synchronous frame of reference of the induction motor;
    estimating an angular position of the rotor, using a position observer of the controller, to thereby generate an estimated rotor position, wherein the position observer operates in a stationary frame of reference of the induction motor;
    calculating a slip position of the rotor, via the position observer, using a commanded d-axis current and a q-axis current of the stator;
    estimating a flux angle of the rotor as a function of the slip position of the rotor and the estimated rotor position to thereby generate an estimated rotor flux angle;
    calculating a corrected rotor flux angle by selectively adding the rotor flux angle error value to the estimated rotor flux angle; and
    controlling output torque of the induction motor via the controller using the corrected rotor flux angle.

2. The method of claim 1, wherein the flux observer is configured to calculate the rotor flux angle value as an arctangent of the d-axis and q-axis flux values.

3. The method of claim 1, wherein calculating a rotor flux angle error value is performed by the controller as a function of the d-axis and q-axis currents and d-axis and q-axis voltages of the stator.

4. The method of claim 1, further comprising measuring the rotor position using a rotary position sensor, wherein estimating the position of the rotor includes processing a measured rotor position from the rotary position sensor through a flux calculation logic block of the controller.

5. The method of claim 1, further comprising a logic switch having an ON logic state when a magnitude of the estimated d-axis flux value or the estimated q-axis flux value exceeds a calibrated threshold, wherein the the rotor flux angle error value is added to the estimated rotor flux angle when the logic switch is in the ON logic state.

6. The method of claim 1, wherein the controller is configured to apply a gain value to the rotor flux angle error value at a magnitude of between 0 and 1, and wherein the magnitude of the gain value corresponds or is in proportion to a magnitude of the estimated d-axis flux value or the estimated q-axis flux value.

7. The method of claim 1, wherein calculating a slip position of the rotor includes calculating a slip frequency of the rotor as a function of a predetermined electrical resistance of the rotor, a predetermined mutual inductance of the induction motor, and a predetermined inductance of the rotor.

8. The method of claim 1, wherein controlling the output torque of the induction motor includes generating and delivering torque from the induction motor to a coupled load via the rotor.

9. The method of claim 1, wherein the coupled load is a set of drive wheels of a motor vehicle.

10. An electrical system comprising:
    an induction motor having a rotor and a stator;
    a rotary position sensor configured to output a position signal indicative of a measured angular position of the rotor; and
    a controller programmed to regulate operation of the induction motor via execution of instructions, wherein execution of the instructions causes the controller to:
        calculate a rotor flux angle error value, via a flux observer, using an estimated d-axis flux value and an estimated q-axis flux value of the rotor, wherein the flux observer operates in a synchronous frame of reference of the induction motor;
        estimate a position of the rotor, using the position signal and a position observer, to thereby generate an estimated rotor position, wherein the position observer operates in a stationary frame of reference of the induction motor;
        calculate a slip position of the rotor, via the position observer, using a d-axis current and a q-axis current of the stator;
        estimate a flux angle of the rotor as a function of the slip position and the estimated rotor position to thereby generate an estimated rotor flux angle;
        calculate a corrected rotor flux angle by selectively adding the rotor flux angle error value to the estimated rotor flux angle; and
        control output torque of the induction motor using the corrected rotor flux angle.

11. The electrical system of claim 10, wherein the flux observer is configured to calculate the rotor flux angle value using an arctangent of the d-axis and q-axis flux values.

12. The electrical system of claim 10, wherein the controller is configured to calculate the rotor flux angle error value as a function of the d-axis and q-axis currents and d-axis and q-axis voltages of the stator.

13. The electrical system of claim 10, wherein the controller is configured to estimate the position of the rotor by processing a measured rotor position from the rotary position sensor through a flux calculation logic block of the controller.

14. The electrical system of claim 10, wherein the controller includes a logic switch having an on state when a magnitude of the estimated d-axis flux value or the estimated q-axis flux value exceeds a calibrated threshold, wherein the controller is configured to add the rotor flux angle error value to the estimated rotor flux angle when the logic switch is in the on state.

15. The electrical system of claim 10, wherein the controller is configured to apply a gain value at a magnitude of between 0 and 1 to the rotor flux angle error value, and wherein the magnitude of the gain value corresponds to a magnitude of the estimated d-axis flux value or the estimated q-axis flux value.

16. The electrical system of claim 10, wherein the controller is configured to calculate the slip position by calculating a slip frequency of the rotor as a function of a predetermined electrical resistance of the rotor, a predetermined mutual inductance of the induction motor, and a predetermined inductance of the rotor, and then using the slip frequency to derive the slip position.

17. The electrical system of claim 10, further comprising a load coupled to the rotor, wherein the controller is configured to generate and deliver torque from the induction motor to the load via the rotor.

18. The electrical system of claim 17, wherein the electrical system is part of a motor vehicle, and wherein the coupled load is a set of drive wheels of the motor vehicle.

* * * * *